(12) United States Patent
Rapson

(10) Patent No.: US 8,329,831 B2
(45) Date of Patent: Dec. 11, 2012

(54) PREPARATION OF SILICONE RUBBER ELASTOMERS

(75) Inventor: Lawrence Rapson, Bay City, MI (US)

(73) Assignee: Dow Corning Corporation, Midland, MI (US)

( * ) Notice: Subject to any disclaimer, the term of this patent is extended or adjusted under 35 U.S.C. 154(b) by 193 days.

(21) Appl. No.: 12/306,057

(22) PCT Filed: Jun. 26, 2007

(86) PCT No.: PCT/US2007/014738
§ 371 (c)(1),
(2), (4) Date: Oct. 7, 2009

(87) PCT Pub. No.: WO2008/002532
PCT Pub. Date: Jan. 3, 2008

(65) Prior Publication Data
US 2010/0012902 A1    Jan. 21, 2010

Related U.S. Application Data

(60) Provisional application No. 60/816,500, filed on Jun. 26, 2006.

(51) Int. Cl.
*C08L 83/05* (2006.01)
*C08L 83/07* (2006.01)

(52) U.S. Cl. ........ 525/478; 428/403; 428/405; 524/423; 524/424; 524/425; 524/430; 524/436; 524/448; 524/451; 525/477; 528/15; 528/31; 528/32

(58) Field of Classification Search .................... None
See application file for complete search history.

(56) References Cited

U.S. PATENT DOCUMENTS

| | | |
|---|---|---|
| 3,122,516 A | 2/1964 | Polmanteer |
| 3,334,062 A | 8/1967 | Brown et al. |
| 3,445,420 A | 5/1969 | Kookootsedes et al. |
| 3,624,023 A | 11/1971 | Hartlage |
| 3,635,743 A | 1/1972 | Smith |
| 3,989,667 A | 11/1976 | Lee et al. |
| 4,500,659 A | 2/1985 | Kroupa et al. |
| 5,008,305 A | 4/1991 | Kennan et al. |
| 5,302,632 A * | 4/1994 | Maxson ................. 523/213 |
| 5,492,994 A * | 2/1996 | Gentle et al. ............ 528/15 |
| 6,376,603 B1 | 4/2002 | Kashiwagi |
| 6,464,923 B2 * | 10/2002 | Tsuji et al. ............. 264/330 |
| 2004/0258977 A1 * | 12/2004 | Frank et al. ............ 429/35 |

FOREIGN PATENT DOCUMENTS

| | | |
|---|---|---|
| EP | 0340129 A1 | 11/1989 |
| EP | 0802233 A2 | 10/1997 |
| EP | 0826733 A2 | 3/1998 |
| EP | 0856561 A2 | 8/1998 |
| EP | 0903379 A2 | 3/1999 |
| EP | 1559744 A1 | 8/2005 |
| JP | 56-036601 A | 4/1981 |
| JP | 07-118534 A | 5/1995 |
| JP | 2004-352617 A | 12/2004 |

OTHER PUBLICATIONS

English language abstract for EP 0340129 extracted from espacenet.com database, dated May 19, 2009.
PCT International Search Report for PCT/US2007/014738 dated Nov. 27, 2007, 3 pages.
Article: Brunauer et al., "BET Method—Adsorption of Gases in Multimolecular Layers", Journal of American Chemical Society, vol. 60, Feb. 1938, pp. 309-319.
English language translation of abstract for Japanese Publication No. 56-036601 obtained from the Japanese Patent website; 1 page.

* cited by examiner

*Primary Examiner* — Marc Zimmer
(74) *Attorney, Agent, or Firm* — Howard & Howard Attorneys PLLC

(57) ABSTRACT

A multi part hydrosilylation curable silicone elastomer composition comprising (i) an organopolysiloxane comprising at least two unsaturated groups and having a viscosity of at least 1,000 mPas at 25° C.; (ii) inorganic filler having a hydrophilic surface; (iii) a filler treating agent comprising an organopolysiloxane comprising at least 2 hydroxy or otherwise hydrolysable groups, or a mixture thereof and having an average degree of polymerization of from 2 to 50; (iv) an organohydrogensiloxane having an average of greater than two silicon bonded hydrogen atoms per molecule having a viscosity of up to about 10 PaS at 25° C.; (v) a hydrosilylation catalyst; and/or a treated filler obtained by the reaction of (ii) and (iii) above characterized in that the filler treating agent (iii) and/or treated filler is packaged separately from organohydrogensiloxane (iv) prior to curing.

13 Claims, No Drawings

US 8,329,831 B2

PREPARATION OF SILICONE RUBBER ELASTOMERS

RELATED APPLICATIONS

This application claims priority to and all the advantages of International Patent Application No. PCT/US2007/014738, filed on Jun. 26, 2007, which claims priority to U.S. Provisional Patent Application No. 60/816,500, filed on Jun. 26, 2006.

This invention is related to a multi-part liquid silicone rubber elastomeric composition and processes for the preparation thereof.

Silicone rubber elastomeric compositions are typically composed of three essential ingredients. These ingredients are a substantially linear silicone polymer, one or more reinforcing filler(s), and a curing system. In the case of liquid silicone rubber compositions the curing system generally comprises a cross-linker in the form of a siloxane polymer containing at least two silicon bonded hydrogen (Si—H) groups and a hydrosilylation catalyst and the composition is cured by a cross-linking reaction between the substantially linear silicone polymer and the cross-linker which is catalysed by the hydrosilylation catalyst. The properties and processing of the composition is dependent on several aspects including the molecular weight (and viscosity) of the silicone polymer, the interaction between the reinforcing filler(s) and the silicone polymer and the nature of the curing agent selected. Silicone rubber compositions may be formulated to be curable at room temperature (e.g. around 25° C.) but typically a degree of heating is required or preferred (even in the case of some room temperature vulcanisable (RTV) compositions. Prior to heat curing the compositions may be maintained as single part compositions which additionally comprise a means of preventing premature curing or partial curing during storage, usually in the form of a catalyst inhibitor. Alternatively, prior to use, the composition may be stored in two or more parts which are mixed together to form the final composition immediately prior to curing. Two part compositions typically comprise a first part in the form of a polymer base composition containing polymer and filler and one of either the cross-linker or the hydrosilylation catalyst and a second part comprising the other of the cross-linker or the hydrosilylation catalyst and other components as required (e.g. additional polymer) in order to prevent curing during storage before the intended use.

Reinforcing fillers are required in the composition to provide the resulting elastomer with a suitable strength in order to gain useful engineering properties. Typically in order for the filler to be incorporated into the polymer it needs to be chemically compatible with such a polymer. Reinforcing fillers for silicone rubber are well known in the art, many of these being available commercially. Reinforcing fillers which may be utilised include silicas such as fumed silica or precipitated silica. Fumed silicas are expensive to make and the resulting reinforcing properties of fumed silicas in silicone elastomers are not always satisfactory. Hence, for reasons of cost and reliability amongst others precipitated silicas are increasingly being used as reinforcing fillers in silicone elastomeric compositions.

One major drawback with the use of mineral fillers as reinforcing and/or non reinforcing fillers in silicone elastomer compositions is that they tend to interact strongly with the silicone polymer during curing unless treated with a hydrophobing treating agent to render the outer surface of the mineral filler (e.g. precipitated silica) hydrophobic. Untreated mineral fillers can be used but are mainly employed to reinforce silicone elastomer compositions for molding process applications. The use of untreated hydrophilic mineral fillers such as precipitated silica as a reinforcing filler may lead to sponging effects during curing of the elastomeric composition. If the outer filler surface remains untreated (i.e. hydrophilic) hydrogen bonding occurs and pendant hydroxyl (OH) groups on the filler surface gradually form secondary bonds with the oxygen (O) in the silicone elastomer backbone a reaction which increases as a function of time. The formation of these secondary bonds during storage results in a gradual hardening of the uncured silicone elastomer composition resulting in an effect known in the industry as "crepe hardening" which adversely affects the processability of the composition which will, for example, crumble and crack when extruded or milled instead of forming a smooth continuous band. Untreated silicas can be used as fillers but not at the level required to reinforce silicone elastomer compositions. The use of untreated hydrophilic silica as a reinforcing filler may also lead to sponging effects during curing of the elastomeric composition.

Hence when used as reinforcing fillers silica fillers such as precipitated silica, and/or fumed silica are generally rendered hydrophobic to enhance their ability to be incorporated into the siloxane polymer. Hydrophobing is undertaken by means of the addition of a suitable treating agent. The silica may be pretreated prior to introduction into the polymer or, as is commonly the case in current industrial processes, the precipitated silica may be rendered hydrophobic in situ by introducing a suitable hydrophobing agent into a mixer together with the silicone polymer and hydrophilic mineral filler (typically silica fillers such as precipitated silica and/or fumed silica, and/or any other silica based filler). The treating agent interacts with the reinforcing filler during its incorporation into the polymer.

The hydrophobing treating agents used are liquids (or chemicals which hydrolyse during compounding to produce such liquids) which chemically interact with —OH groups on the surface of the hydrophilic filler materials to render them hydrophobic. Preferred treating agents for silicone elastomeric compositions include hydroxy or otherwise hydrolysable silanes such as alkoxysilanes, low molecular weight hydroxyl or alkoxy end-blocked polydiorganosiloxanes containing an average degree of polymerisation of from 2 to 20 and/or silazanes such as hexaorganodisilazanes or mixtures thereof.

A wide variety of methods have been proposed for the hydrophobing of reinforcing fillers such as precipitated silicas and/or fumed silicas and typically optional non-reinforcing fillers which are hydrophilic in nature. As described in U.S. Pat. No. 4,500,659 the fillers may be pre-treated prior to mixing with the siloxane polymer or mixed in situ during the compounding stage when the polymer and filler are mixed. Examples of methods of pre-treatment are described in EP1559744, EP0340129, U.S. Pat. No. 5,008,305, U.S. Pat. No. 3,122,516, U.S. Pat. No. 3,334,062, U.S. Pat. No. 3,635,743 and U.S. Pat. No. 3,624,023. One perceived advantage of pre-treating hydrophilic fillers discussed in EP1559744 is the fact that pre-treatment renders the fillers easily and comparatively quickly mixable into the polymer without carrying out hot mixing, i.e. without the need for the introduction of heat during the compounding (mixing) phase however often a "hot" mixing step is used as a final step of the pre-treatment process to remove unwanted by-products.

A favoured route for in situ treating hydrophilic fillers involves the introduction of hexaorganodisilazanes during the mixing of polymer and filler. Typically hexaorganodisilazanes such as hexamethyldisilazane (HMDZ) are introduced into the filler/siloxane mixture in the presence of water. The disilazane and water interact to produce an intermediate having —OH groups which readily react with the —OH groups on the hydrophilic surface of the filler. Whilst such an in situ mixing process provides excellent hydrophobic coatings on the filler particles, unwanted by-products such as ammonia are produced during the hydrophobing reaction. Unfortunately these ammonical by-products are known to poison hydrosilylation cure catalysts and as such must be removed. Removal of the ammoniacal by-products is achieved by undertaking a heat stripping step to remove the unwanted by-products. The stripping step is carried out for several hours at temperatures of between 130° C. and 200° C. and as such is very expensive as it involves "hot mixing" processes which consume a lot of energy and time on capital intensive equipment.

Short chain siloxanes and silanes both of which contain alkoxy groups and/or OH groups may be used for in situ treatment of the filler. Whilst not wishing to be limited to current theory, it is considered that the resulting filled siloxane based compositions are generally known to deteriorate during storage unless water and/or alcoholic by-products were stripped out from the mixture subsequent to preparation. The in situ process utilised is therefore analogous to the process described above for the in situ treating of fillers with hexaorganodisilazanes in that after mixing the resulting base composition is subjected to an essential stripping step at elevated temperatures to remove water and/or alcoholic by-products produced by the reaction of the treating agent and filler surface in order to avoid curing and storage problems. Typically the stripping step necessitated the heating of the polymer/treating agent/filler base mixture to 140-190° C. for a period of up to 1 to 5 hours.

The inventors of the present invention have now unexpectedly identified a method of in situ treatment for rendering hydrophilic fillers hydrophobic in siloxane based compositions without the need for stripping out by-products thereby eliminating the need for the previously essential stripping step for the removal of unwanted by-products from the reaction between the filler and treating agents which involved expensive high temperature "hot" mixing steps, thereby significantly reducing power consumption and duration required for the in situ treatment of hydrophilic fillers.

In accordance with the present invention there is provided a multi part hydrosilylation curable silicone elastomer composition comprising
 (i) an organopolysiloxane comprising at least two unsaturated groups and having a viscosity of at least 1,000 mPa·s at 25° C.;
 (ii) inorganic filler having a hydrophilic surface;
 (iii) a filler treating agent comprising an organopolysiloxane comprising at least 2 hydroxy or otherwise hydrolysable groups, or a mixture thereof and having an average degree of polymerisation of from 2 to 50;
 (iv) an organohydrogensiloxane having an average of greater than two silicon bonded hydrogen atoms per molecule having a viscosity of up to about 10 Pa·s at 25° C.;
 (v) a hydrosilylation catalyst;
 and/or a treated filler obtained by the reaction of (ii) and (iii) above characterised in that the filler treating agent (iii) and/or treated filler is packaged separately from organohydrogensiloxane (iv) prior to curing.

To date, there has been no recognition of a relationship between filler treating agent and/or treated filler and cross-linkers, in particular organohydrogensiloxanes, in terms of an effect on curing and storage problems with, or catalyst poisoning within, multi part hydrosilylation curable silicone elastomer compositions. By packaging the filler treating agent and/or treated filler separate from the organohydrogensiloxane, the inventors have found that curing and storage problems, as well as catalyst poisoning problems, are reduced in the resulting compositions. Further, the curing and storage problems, as well as catalyst poisoning problems, are reduced even in the absence of a stripping step, which those of skill in the art previously regarded as a necessary step to reduce curing and storage problems in similar compositions.

Component (i) the organopolysiloxane polymer has the average composition of

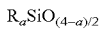

in which R is selected from substituted and unsubstituted monovalent hydrocarbon groups and is exemplified by alkyl groups such as methyl, ethyl, and propyl, preferably each alkyl group contains from 1 to 10 carbon atoms, more preferably each alkyl group is a methyl or ethyl group most preferably each alkyl group is a methyl group; alkenyl groups such as vinyl, allyl, butenyl, and hexenyl; aryl groups such as phenyl; and aralkyls such as 2-phenylethyl. The alkyl groups may be substituted with in particular fluoro groups such that one or more alkyl groups may be trifluoroalkyl groups, e.g. trifluoropropyl groups or perfluoroalkyl groups. The average value of subscript a is from 1.95 to 2.05.

The organosiloxane polymer has at least 2 silicon-bonded alkenyl groups in each molecule. The alkenyl groups can be bonded in pendant positions, at the terminal positions, or at both positions. The degree of polymerization (dp) of such polymers is in the range of from 200 to 20,000. Silicone rubber may be made using polymers that are thick flowable liquids which are known in the industry as liquid silicone rubbers. These materials can typically be pumped through a die or the like without the use of a screw-type extruder. Such polymers are thick flowable liquids and have a degree of polymerisation (dp) below about 1500 and have a viscosity of between about 200 to 100,000 mPa·s at 25° C.

The above dp range also includes polymers with a stiff gum-like consistency which have a dp above about 1500 and have a Williams plasticity number (ASTM D926) in the range of from about 30 to 250, and preferably from 95 to 125 (The plasticity number, as used herein, is defined as the thickness in millimeters×100 of a cylindrical test specimen 2 cm³ in volume and approximately 10 mm in height after the specimen has been subjected to a compressive load of 49 Newtons for three minutes at 25° C.). Such gum-like polymers are generally used in compression or transfer molds, calendaring, screw-type extruders or the like.

The organosiloxane polymer can be a homopolymer or a copolymer or a mixture of such polymers. The siloxy units comprising the organosiloxane polymer are exemplified by dialkylsiloxy groups wherein each alkyl group may be the same or different, alkenylmethylsiloxy groups where the alkenyl group contains from 2 to 10 carbon atoms, preferably vinyl or hexenyl, and alkylphenylsiloxy wherein the alkyl groups are as hereinbefore described. Any suitable terminal groups in the organosiloxane polymer may be utilised, examples include trialkylsiloxy, and alkenyldialkylsiloxy groups wherein the alkenyl and alkyl groups are as hereinbefore described. Examples of the polymer which may be used include vinyldimethylsiloxy-enblocked dimethylsiloxane-vinylmethylsiloxane copolymer, vinyldimethylsiloxy-endblock polydimethylsiloxane, vinylmethylhydroxysiloxy-endblocked dimethylsiloxane-vinylmethylsiloxane copolymer, and vinyldimethylsiloxy-endblocked dimethylsiloxane-methylphenylsiloxane-vinylmethylsiloxane copolymer vinyldimethylsiloxy-endblocked dimethylsiloxane-trifluoropropylmethylsiloxane copolymer, and vinyldimethylsiloxy-endblocked dimethylsiloxane-trifluoropropylmethylsiloxane-vinylmethylsiloxane copolymer.

Component (ii) may be any suitable inorganic filler or combination of inorganic fillers at least one of which have a hydrophilic outer surface. For example, the compositions will normally contain one or more finely divided, reinforcing fillers such as high surface area fumed and/or precipitated silicas including rice hull ash and to a degree calcium carbonate. The term "precipitated silica" is for the sake of this application intended to meant any silica obtained by a precipitation reaction of a silicate, such as an alkaline metal silicate e.g. sodium silicate, with an acid such as sulphuric acid; any suitable silica precipitation process may be used here, preferred methods include: the addition of suitable acid into a silicate medium or the total or partial simultaneous addition of acid and silicate into water or a silicate medium. Additional non-reinforcing fillers such as crushed quartz, diatomaceous earths, barium sulphate, iron oxide, titanium dioxide and carbon black, talc, wollastonite may be used as well as silica and/or calcium carbonate fillers. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

Preferably filler utilised, particular silica fillers e.g. precipitated silica fillers have a BET specific surface ranging from 50 to 450 m$^2$/g, preferably from 60 to 250 m$^2$/g. The BET specific surface is determined by the BRUNAUER-EMMET-TELLER method described in the Journal of the American Chemical Society, Vol. 60, page 309, February 1938 and is in accordance with NF T 45007 standard (November 1987).

The proportion of such fillers when employed will depend on the properties desired in the elastomer-forming composition and the cured elastomer. Usually the total filler content of the composition will reside within the range from about 5 to about 800 parts by weight, preferably from 25 to 400 parts by weight per 100 parts by weight of the polymer.

Component (iii) is a filler treating agent (or a mixture of treating agents) comprising an organopolysiloxane comprising at least 2 hydroxy or otherwise hydrolysable groups, or a mixture thereof and having an average degree of polymerisation of from 2 to 50. Preferably Component (iii) also comprises units of the formula

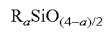

$$R_aSiO_{(4-a)/2}$$

in which R is selected from substituted and unsubstituted monovalent hydrocarbon groups and is exemplified by aryl groups such as phenyl groups or alkyl groups such as methyl, ethyl, isopropyl, tertiary butyl and propyl, preferably each alkyl group contains from 1 to 10 carbon atoms, more preferably each alkyl group is a methyl or ethyl group most preferably each alkyl group is a methyl group. The alkyl groups may be substituted with in particular fluoro groups such that one or more alkyl groups may be either trifluoroalkyl groups, e.g. trifluoropropyl groups or perfluoroalkyl groups. R may also be selected from alkenyl groups such as vinyl, allyl and/or hexenyl groups. The average value of subscript a is from 1.95 to 2.05. The at least two hydroxy groups may be terminal hydroxy groups or pendent groups on the chain or both. Each hydrolysable group may be any suitable hydrolysable group which will interact with only "cold" mixing with —OH groups on the hydrophilic filler surface. Preferably each hydrolysable group is an alkoxy group having from 1 to 10 carbon atoms most preferably, if present the each alkoxy group is a methoxy group or ethoxy group. The viscosity of component (iii) is preferably between 10 and 1000 mPa·s but may be greater if required. The filler treating agent is typically provided in an amount of from 0.5 to 12% by weight of the weight of the filler (component (ii)).

Treating fillers results in improved room temperature mechanical properties of the uncured compositions. Furthermore, the surface treated fillers give a lower conductivity than untreated or raw material. Usually fillers (component (ii)) are treated in situ using an appropriate treating agent or mixture thereof as described above. However the filler(s) could be pre-treated if desired. Whilst a pre-treatment step is generally avoided as it introduces an additional step into the mixing process, pre-treated surface modified fillers, when prepared, do not clump, and can be homogeneously incorporated into the silicone polymer.

Component (iv) is an organohydrogensiloxane having an average of greater than two silicon bonded hydrogen atoms per molecule and a viscosity of up to about 10 Pa·s at 25° C. The organohydrogensiloxane which functions as a cross-linker contains an average of at least two silicon-bonded hydrogen atoms per molecule, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cycloalkyls such as cyclohexyl; and aryls such as phenyl and tolyl and/or trifluoroalkyl groups, e.g. trifluoropropyl groups or perfluoroalkyl groups. Such materials are well known in the art. The molecular structure of the organohydrogensiloxane may be linear, linear including branching, cyclic, or network-form or mixture thereof. There are no particular restrictions on the molecular weight of the organohydrogensiloxane, however it is preferable that the viscosity at 25° C. be 3 to 10,000 mPa·s. Furthermore, the amount of component (iv) that is added to the composition is an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. If this molar ratio is less than 0.5, curing of the present composition becomes insufficient, while if this molar ratio exceeds 20 hydrogen gas is evolved so that foaming occurs.

The silicon-bonded organic groups present in the organohydrogensiloxane can include substituted and unsubstituted alkyl groups of 1-4 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Component (v) is a hydrosilylation catalyst. Preferably the hydrosilylation catalyst chosen may comprise any suitable hydrosilylation catalyst such as a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is a platinum based catalyst. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as [Rh$(O_2CCH_3)_2]_2$, Rh$(O_2CCH_3)_3$, Rh$_2(C_8H_{15}O_2)_4$, Rh$(C_5H_7O_2)_3$, Rh$(C_5H_7O_2)(CO)_2$, Rh$(CO)[Ph_3P](C_5H_7O_2)$, RhX$^4_3$[(R$^3)_2$S]$_3$, (R$^2_3$P)$_2$Rh(CO)X$^4$, (R$^2_3$P)$_2$Rh(CO)H, Rh$_2$X$^4_2$Y$^2_4$, H$_a$Rh$_b$olefin$_c$Cl$_d$, Rh(O(CO)R$^3)_{3-n}$(OH)$_n$ where X$^4$ is hydrogen, chlorine, bromine or iodine, Y$^2$ is an alkyl group, such as methyl or ethyl, CO, C$_8$H$_{14}$ or 0.5 C$_8$H$_{12}$, R$^3$ is an alkyl radical, cycloalkyl radical or aryl radical and R$^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as Ir(OOCCH$_3$)$_3$, Ir(C$_5$H$_7$O$_2$)$_3$, [Ir(Z$^4$)(En)$_2$]$_2$, or (Ir(Z$^4$)(Dien)]$_2$, where Z$^4$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

Optional additives for a silicone rubber composition in accordance with the present invention may comprise one or more of the following hydrosilylation catalyst inhibitors, rheology modifiers, pigments, colouring agents, anti-adhesive agents adhesion promoters, heat stabilisers, blowing agents, flame retardants, electrically and/or thermally conductive fillers, and desiccants.

Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors is the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

Compositions containing these catalysts typically require heating at temperatures of 70° C. or above to cure at a practical rate. Room temperature cure is typically accomplished with such systems by use of a two-part system in which the cross-linker and inhibitor are in one of the two parts and the platinum is in the other part. The amount of platinum is increased to allow for curing at room temperature. The optimum concentration of platinum catalyst inhibitor is that which will provide the desired storage stability or pot life at ambient temperature without excessively prolonging the time interval required to cure the present compositions at elevated temperatures. This amount will vary widely and will depend upon the particular inhibitor that is used, the nature and concentration of the platinum-containing catalyst (v) and the nature of the cross-linker (iv). Inhibitor concentrations as low as one mole of inhibitor per mole of platinum will in some instances yield a desirable level of storage stability and a sufficiently short curing period at temperatures above about 70° C. In other cases, inhibitor concentrations of up to 10, 50, 100, 500 or more moles per mole of platinum may be needed. The optimum concentration for a particular inhibitor in a given composition can be determined by routine experimentation.

The rheological modifiers include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in a composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane, reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane, epoxyalkylalkoxy silane, mercaptoalkylalkoxy silane, and derivatives thereof.

Heat stabilizers may include Iron oxides and carbon blacks, Iron carboxylate salts, cerium hydrate, titania, barium zirconate, cerium and zirconium octoates, and porphyrins.

Flame retardants may include for example, carbon black, hydrated aluminium hydroxide, and silicates such as wollastonite, platinum and platinum compounds.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Other optional ingredients include handling agents, acid acceptors, and UV stabilisers.

Handling agents are used to modify the uncured properties of the silicone rubber such as green strength or processability sold under a variety of trade names such as SILASTIC® HA-1, HA-2 and HA-3 from Dow Corning Corporation.

The acid acceptors may include Magnesium oxide, calcium carbonate, Zinc oxide and the like.

The ceramifying agents can also be called ash stabilisers and include silicates such as wollastonite.

Prior to use the final composition as hereinbefore described must be maintained in at least two parts which can be easily mixed together in a final mixing step immediately prior to curing the resultant composition to form an elastomeric solid. Preferably the composition is stored in either two or three parts prior to use.

In a preferred two part composition a first part hereafter referred to as Part A will preferably comprise polymer, treated filler, catalyst and possibly residual treating agent and the second part hereafter referred to as part B will comprise cross-linker or cross-linker and polymer. Part A and Part B in a two part composition may be mixed in any suitable ratio in an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. Typically the cross-linker will be present in the polymer at a level in Part B such that Part A and Part B will be mixed preferably in a ratio of from 1:10 to 100:1, more preferably 20:1 to 1:5 and most preferably from 10:1 to 1:2.

Optional additives may be present in either part A or part B providing they do not negatively affect the properties of the resulting elastomer.

In a preferred three part composition Part A comprises polymer, catalyst, treated filler and possibly residual treating agent; Part B comprises polymer, treated filler, and possibly residual treating agent and Part C comprises cross-linker and optionally polymer. Again the optional additives may be present in any of parts A, B or C, however preferably other than inhibitor they are most preferably retained in parts A and B. Part A and Part B in a three part composition may be mixed in any suitable ratio, typically preferably in a ratio of from 1:10 to 10:1, more preferably 5:1 to 1:5 and most preferably from 2:1 to 1:2. Part C in a three part composition as described above will typically be significantly smaller than part A and part B and as such the ratio of A:B:C may be for example in the region of e.g. 49:49:2 but will typically be determined by the amount of crosslinker present in part C to achieve an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1.

One unexpected problem around the use of treating agents (iii) as a means of hydrophobing fillers (ii) has been a comparatively poor aging profile of compositions comprising these treated fillers. The inventors believe that they have now solved this problem by maintaining cross-linker (iv) in a separate composition from the treated filler (and possibly treating agent) until immediately prior to use.

The inventors have found that by separating the resulting composition is significantly more stable in storage if the filler treating agent (iii) and the cross-linker (iv) are kept apart from each other. The treating agent (iii) may be used to either pretreat hydrophilic filler (ii) with the resulting pre-treated filler subsequently being introduced into a polymer (i) composition which does not contain cross-linker (iv). The cross-linker free composition is then stored until immediately prior to use when it is mixed with cross-linker or more preferably a cross-linker composition comprising polymer (i) and cross-linker (iv). By "immediately prior to use", it is meant that the cross-linker free composition and the cross-linker are typically stored separately until about 24 hours prior to curing, more typically until about 6 hours prior to curing. It is to be appreciated that the fact that the cross-linker and treated filler are stored apart results in the fact that no hot mixing step where heat needs to be applied is necessary to drive off unwanted by-products such as water and/or methanol and/or ethanol and the like.

Alternatively the treating agent (iii) may be utilised to treat filler (ii) in situ to form a polymer composition comprising at least polymer (i) and treated filler. One benefit in the case of the latter is that the inventors have determined that by avoiding contact between aqueous and or alcoholic by-products produced during the in situ treatment of hydrophilic fillers as well as the treated fillers themselves and cross-linker (iv) results in the avoidance of the previously understood necessity to strip out the by-products which is contrary to the teaching of previously described processes in the art where an essential and typically cost determining step in the in situ process is the removal of by-products to prevent catalyst poisoning (hexaalkyldisilazanes) or storage and curing problems (Short chain siloxanes and silanes both of which contain at least 2 alkoxy groups and/or OH groups). This results in a significantly reduced mixing period required, typically <1 hour compared to 5-7 hours with the HMDZ treatment and 3 or so hour process required for Short chain siloxanes and silanes both of which contain alkoxy groups and/or OH groups due to the stripping stage for the removal of ammonical, water and/or alcoholic by-products) as the stripping step is avoided. Whilst heat will be generated during the mixing process due to shear the temperature of the reactants being mixed should remain under 100° C. and no external heat source will be required.

It is to be appreciated that in accordance with the process of the present invention that the components are typically "cold mixed" i.e. the only means of heating during mixing is as a result of shear/friction during mixing. The temperature reached due to frictional heat will depend on the mixer being used and on high shear mixers could reach up to 200° C. but typically in the present invention as the stripping stage in the process is avoided then preferably the mixing temperature for each component of the present composition will be less than 100° C., more preferably less than 75° C.

Any suitable mixer may be used to mix the individual components and the final mixture when the components are mixed together prior to curing. The chosen mixer will typically determine the temperature of mixing the separate components. Generally a low shear type mixer is preferred to minimise temperature rises during mixing.

The in situ mixing of polymer, treating agent and filler may be carried out in any suitable order for example a proportion of polymer and all the treating agent may be initially mixed together prior to addition of the filler, which is preferably gradually introduced into the mixer. Once a substantially homogeneous mixture has been prepared the remaining polymer may be introduced. Alternatively all the polymer and treating agent in the filled base composition may be pre-mixed prior to the introduction of the hydrophilic filler.

The optional ingredients described above may be added into any component or components of the multi component composition, as desired.

Optionally in one embodiment of the invention the base component may be prepared by in situ "cold mixing" polymer, treating agent and filler to form a polymer base component and the cross-linker component is present alone or in a composition in which, if filler is present, contains filler pre-treated or in situ treated using a traditional method involving the stripping out of residual by-products.

In accordance to a further embodiment of the present invention there is provided a process for the preparation of a composition as hereinbefore described comprising the steps (a) treating an inorganic filler having a hydrophilic surface with a filler treating agent comprising an organopolysiloxane comprising at least 2 hydroxy groups, 2 alkoxy groups or a mixture thereof and having an average degree of polymerisation of from 2 to 50;
(b) mixing the product of step (a) into a multi component composition comprising
    an organopolysiloxane comprising at least two unsaturated groups and having a viscosity of at least 1,000 mPa·s at 25° C. (i);
    an organohydrogensiloxane having an average of greater than two silicon bonded hydrogen atoms per molecule having a viscosity of up to about 10 Pa·s at 25° C. (iv); and
    a hydrosilylation catalyst (v);
    wherein each part containing the reaction product of step (a) does not contain any organohydrogensiloxane (iv) prior to curing.

In accordance to a further embodiment of the present invention there is provided a process for the preparation of a composition as hereinbefore described comprising the steps of mixing the following components into a multi-part composition
(i) an organopolysiloxane comprising at least two unsaturated groups and having a viscosity of at least 1,000 mPa·s at 25° C.;
(ii) inorganic filler having a hydrophilic surface
(iii) a filler treating agent comprising an organopolysiloxane comprising at least 2 hydroxy groups and having an average degree of polymerisation of from 2 to 50;
(iv) an organohydrogensiloxane having an average of greater than two silicon bonded hydrogen atoms per molecule having a viscosity of up to about 10 Pa·s at 25° C.
(v) a hydrosilylation catalyst;
    characterised in that the filler treating agent (iii) and the products of the reaction thereof with component (ii) is packaged separately from organohydrogensiloxane (iv) during storage and that the components in the multi part composition are mixed together immediately prior to use.

In accordance to a further embodiment of the present invention there is provided a process for the preparation of a composition as hereinbefore described comprising the following steps:
(a) treating an inorganic filler having a hydrophilic surface with a filler treating agent comprising an organopolysiloxane comprising at least 2 hydroxy groups, 2 alkoxy groups or a mixture thereof and having an average degree of polymerisation of from 2 to 50;
(b) mixing the product of step (a) into a multi component composition comprising
(i) an organopolysiloxane comprising at least two unsaturated groups and having a viscosity of at least 1,000 mPa·s at 25° C.;
(ii) an organohydrogensiloxane having an average of greater than two silicon bonded hydrogen atoms per molecule having a viscosity of up to about 10 Pa·s at 25° C.
(iii) a hydrosilylation catalyst;
    characterised in that the filler treating agent (iii) and the products of the reaction thereof with component (ii) is packaged separately from organohydrogensiloxane (iv) during storage and that the components in the multi part composition are mixed together immediately prior to use.

In accordance to a further embodiment of the present invention there is provided a process for the preparation of a composition as hereinbefore described comprising the steps of mixing the following components into a multi-part composition Mixing an organopolysiloxane comprising at least two unsaturated groups and having a viscosity of at least 1,000 mPa·s at 25° C.; with an inorganic filler having a hydrophilic surface and a filler treating agent comprising an organopolysiloxane comprising at least 2 hydroxy groups, 2 alkoxy groups or a mixture thereof and having an average degree of polymerisation of from 2 to 50; to form a polymer base composition;
Introducing a hydrosilylation catalyst into some or all of the polymer base composition;
Providing an organohydrogensiloxane (iv) alone or in the form of a composition additionally containing an organopolysiloxane comprising at least two unsaturated groups and having a viscosity of at least 1,000 mPa·s at 25° C.;
Storing the separate components until required for use and
Mixing the components together to form a curable elastomeric composition.

The invention will now be described by way of Example in which the percentage weight of catalyst refers to the amount of a catalyst masterbatch comprising 2% by weight of a 1,3-diethenyl-1,1,3,3-tetramethyldisiloxane complex of platinum and 98% by weight of dimethylvinyl terminated dimethyl siloxane having a viscosity of 400 mPa·s at 25° C. The amount of inhibitor given refers to the amount of an inhibitor masterbatch comprising 3% by weight of 1-ethynyl-2-cyclohexanol in 97% by weight of dimethylvinyl siloxy terminated dimethyl methylvinyl siloxane having a viscosity of 350 mPa·s at 25° C. The precipitated silica filler used had an average particle size of about 11 μm and a specific surface area of about 220 m²/g.

EXAMPLE 1

In this Example a three part composition is provided in accordance with the present invention. In the three part composition part A contains the catalyst, part B contains inhibitor and Part C contains the cross-linker. Parts A and B contain in situ treated precipitated filler and part C is filler free.

TABLE 1

|  | Part A (%) | Part B | Part C |
|---|---|---|---|
| Dimethylvinylsiloxy terminated dimethyl siloxane (9000 mPa · s at 25° C.) | 71.08 | 69.45 | 0 |
| Dimethylvinylsiloxy terminated dimethyl siloxane (2000 mPa · s at 25° C.) | 10.10 | 10.0 | 0 |
| Dimethylhydroxy terminated dimethylsiloxane (41 mPa · s at 25° C.) | 1.05 | 1.05 | 0 |

TABLE 1-continued

| | Part A (%) | Part B | Part C |
|---|---|---|---|
| Precipitated silica filler | 17.50 | 17.50 | 0 |
| Platinum catalyst masterbatch | 0.27 | 0 | 0 |
| 1-ethynyl-2-cyclohexanol masterbatch | 0 | 2.00 | 0 |
| Dimethylvinylsiloxy terminated dimethyl siloxane (4000 mPa · s at 25° C.) | 0 | 0 | 21.50 |
| Trimethylsiloxy terminated dimethyl methyl-hydrogen siloxane (5 mPa · s at 25° C.) | 0 | 0 | 78.50 |

Part A was prepared by initially mixing the polymer and treating agent for a period of 5 minutes then the filler and catalyst masterbatch were added and mixed together for a further 30 minutes.
Part B was prepared by initially mixing the polymer and treating agent for a period of 5 minutes then the filler and inhibitor masterbatch were added and mixed together for a further 30 minutes.
Part C was prepared by merely weighing out the polymer and cross-linker and mixing them together until homogeneous.

The three separate parts were stored apart and mixed together using a Speed Mixer DAC 150 FV (dental mixer) for 3-20 second cycles and the cup was scraped between cycles shortly before curing in a ratio of Part A:Part B:Part C of 48:48:2.

To show that the cure properties of the composition do not significantly deteriorate during storage with time samples of part A, part B and Part C were mixed together after the periods of time from preparation indicated in Table 2 below and values of Torque, scorch, the time to 50% of the total cure (TC-50) and time to 90% total cure (TC 90) were determined in accordance with the processes defined in ASTM D5289-95(2001) "Standard Test Method for Rubber Property—vulcanization Using Rotorless Cure Meters". The final composition was cured using a Monsanto Rheometer MDR-2000; 6 minute, 240 F (115.5 C), 1-degree arc.

TABLE 2

| Time (Day) | Torque (Nm$^{-1}$) | Scorch 1 (s) | Scorch 2 (s) | TC-50 (s) | TC-90 (s) |
|---|---|---|---|---|---|
| 1 | 2588.4 | 24.6 | 25.8 | 29.09 | 38.69 |
| 7 | 2386.98 | 29.4 | 30.6 | 34.24 | 46.87 |
| 28 | 2393.99 | 33.6 | 34.8 | 38.38 | 51.64 |

The final composition was cured for 5 minutes at 350 F (166° C.) and the physical properties of the resulting cured elastomer were tested and the results are provided in Table 3.

TABLE 3

| Test | Method | Result |
|---|---|---|
| Hardness Shore A | | 41.5 |
| Tensile Strength (psi) | (ISO 37: 1994 Type 2) | 545 psi |
| Elongation at Break (%) | (ISO 34: 1994 Type 2) | 333 |
| Tear (ppi) | (ASTM 624 -98, Die B) | 25.8 ppi |
| Shrink (cured for 10 mins at 350 F. (166° C.)) | | 3.55 |
| Compression Set (22 hrs @ 177° C.) | | 50.4 |
| Specific Gravity | ASTM D1475-98 | 1.04 |
| Extrusion rate (g/min) Part A | ASTM D2452-94 | 331 |
| Extrusion rate (g/min) Part B | ASTM D2452-94 | 360 |

COMPARATIVE EXAMPLE

The following Comparative Example depicts a two part composition in which Part B comprises treated filler in the presence of cross-linker. The two part composition utilised is detailed in Table 4 below. Unless otherwise indicated the components of the composition were the same as those used in Example 1 above.

TABLE 4

| Ingredient | Part A (% wt) | Part B (% wt) |
|---|---|---|
| Dimethylvinylsiloxy terminated dimethyl siloxane (9000 mPa · s at 25° C.) | 35.43 | 34.08 |
| Dimethylvinylsiloxy terminated dimethyl siloxane (2000 mPa · s at 25° C.) | 34.88 | 36.78 |
| Dimethylhydroxy terminated dimethylsiloxane (41 mPa · s at 25° C.) | 1.25 | 1.25 |
| Dimethylhydroxy terminated dimethylmethylvinyl siloxane (20 mPa · s at 25° C.) | 0.17 | 0.17 |
| 1-ethynyl-2-cyclohexanol masterbatch | 0 | 2.0 |
| Dimethylvinylsiloxy terminated dimethyl methyl vinyl siloxane (350 mPa · s at 25° C.) | 8.0 | 0 |
| Precipitated silica filler | 20.0 | 20.0 |
| Platinum catalyst masterbatch | 0.27 | 0 |
| Trimethylsiloxy terminated dimethyl methylhydrogen siloxane (7.2 mPa · s at 25° C.) | 0 | 5.28 |
| Trimethylsiloxy terminated dimethyl methylhydrogen siloxane (15 mPa · s at 25° C.) | 0 | 0.44 |

Part A was prepared by pretreating the filler with the treating agent, after which the polymer, pretreated filler, and catalyst masterbatch were mixed together for 30 minutes.
Part B was prepared by mixing the pretreated filler, inhibitor masterbatch, and cross-linker together for 30 minutes.

The two separate parts were stored apart and mixed together using a Speed Mixer DAC 150 FV (dental mixer) for 3-20 second cycles and the cup was scraped between cycles shortly before curing in a ratio of Part A:Part B: of 1:1.

To show that the cure properties of the composition significantly deteriorate during storage with time samples of part A and part B were mixed together after the periods of time from preparation indicated in Table 5 below and values of Torque, scorch, the time to 50% of the total cure (TC-50) and time to 90% total cure (TC 90) were determined in accordance with the processes defined in ASTM D5289-95(2001) "Standard Test Method for Rubber Property—vulcanization Using Rotorless Cure Meters". The final composition was cured using a Monsanto Rheometer MDR-2000; 6 minute, 240 F (115.5 C), 1-degree arc.

TABLE 5

| Time (Day) | Torque (Nm$^{-1}$) | Scorch 1 (s) | Scorch 2 (s) | TC-50 (s) | TC-90 (s) |
|---|---|---|---|---|---|
| 1 | 2112.03 | 74.4 | 84.6 | 113.8 | 194.1 |
| 7 | 1803.81 | 65.4 | 75.0 | 98.25 | 191.7 |
| 30 | 1395.76 | 85.2 | 99.0 | 127.2 | 261.4 |

Obviously, many modifications and variations of the present invention are possible in light of the above teachings, and the invention may be practiced otherwise than as specifically described within the scope of the appended claims.

The invention claimed is:

1. A multi part hydrosilylation curable silicone elastomer composition comprising
 (i) an organopolysiloxane comprising at least two unsaturated groups and having a viscosity of at least 1,000 mPa·s at 25° C.;
 (ii) inorganic filler having a hydrophilic surface;
 (iii) a filler treating agent comprising an organopolysiloxane comprising at least 2 hydroxy or otherwise hydrolysable groups, or a mixture thereof and having an average degree of polymerisation of from 2 to 50;
 (iv) an organohydrogensiloxane having an average of greater than two silicon bonded hydrogen atoms per molecule and having a viscosity of up to about 10 Pa·s at 25° C.;
(v) a hydrosilylation catalyst;
and/or a treated filler obtained by the reaction of (ii) and (iii) above;
characterised in that the filler treating agent (iii) and/or the treated filler is packaged separately from the organohydrogensiloxane (iv) prior to curing and wherein said composition is in three parts in which
Part A comprises organopolysiloxane (i), catalyst (v), treated filler and optionally residual filler treating agent (iii);
Part B comprises organopolysiloxane (i), treated filler, and optionally residual filler treating agent (iii); and
Part C comprises organohydrogensiloxane (iv) and optionally organopolysiloxane (i).

2. A composition in accordance with claim 1 characterised in that the organopolysiloxane (i) comprises units of the following formula:

in which R is selected from substituted and unsubstituted monovalent hydrocarbon groups selected from optionally substituted alkyl groups having from 1 to 10 carbon atoms, alkenyl groups, and aryl groups, and the average value of a is from 1.95 to 2.05.

3. A composition according to claim 1 wherein the inorganic filler (ii) is selected from one or more of the group of high surface area fumed silica, precipitated silica, calcium carbonate, crushed quartz, diatomaceous earths, barium sulphate, iron oxide, titanium dioxide, carbon black, talc, wollastonite, aluminite, calcium sulphate (anhydrite), gypsum, calcium sulphate, magnesium carbonate, kaolin, Kaolinite, aluminium trihydroxide, magnesium hydroxide (brucite), graphite, copper carbonate, nickel carbonate, barium carbonate, strontium carbonate, aluminium oxide, and silicates selected from the group consisting of olivine group; garnet group; aluminosilicates; ring silicates; chain silicates; and sheet silicates.

4. A composition according to claim 1 in which the inorganic filler (ii) comprises precipitated silica.

5. A composition according to claim 1 characterised in that the filler treating agent (iii) comprises units of the formula

in which R is selected from substituted and unsubstituted monovalent hydrocarbon groups selected from optionally substituted alkyl groups having from 1 to 10 carbon atoms, alkenyl groups, and aryl groups, and the average value of a is from 1.95 to 2.05.

6. A composition according to claim 1 in which the hydrosilylation catalyst (v) is selected from a platinum, rhodium, iridium, palladium or ruthenium based catalyst.

7. A composition in accordance with claim 1 which additionally comprises one or more of the following; hydrosilylation catalyst inhibitors, rheology modifiers, pigments, colouring agents, anti-adhesive agents adhesion promoters, heat stabilisers, blowing agents, flame retardants, electrically and/or thermally conductive fillers, and desiccants.

8. A method of preparing a composition in accordance with claim 1 comprising the steps of:
mixing the following components into a multi-part composition: an organopolysiloxane comprising at least two unsaturated groups and having a viscosity of at least 1,000 mPa·s at 25° C.; an inorganic filler having a hydrophilic surface; and a filler treating agent comprising an organopolysiloxane comprising at least 2 hydroxy, alkoxy, or otherwise hydrolysable groups, or a mixture thereof and having an average degree of polymerisation of from 2 to 50; to form a polymer base composition;
introducing a hydrosilylation catalyst into some or all of the polymer base composition;
providing an organohydrogensiloxane (iv) alone or in the form of a composition additionally containing an organopolysiloxane comprising at least two unsaturated groups and having a viscosity of at least 1,000 mPa·s at 25° C.;
storing the separate components until required for use; and
mixing the components together to form a curable elastomeric composition.

9. A method of preparing a composition in accordance with claim 1 comprising the steps of mixing the following components into a multi-part composition
(i) an organopolysiloxane comprising at least two unsaturated groups and having a viscosity of at least 1,000 mPa·s at 25° C.;
(ii) inorganic filler having a hydrophilic surface;
(iii) a filler treating agent comprising an organopolysiloxane comprising at least 2 hydroxy groups and having an average degree of polymerisation of from 2 to 50;
(iv) an organohydrogensiloxane having an average of greater than two silicon bonded hydrogen atoms per molecule and having a viscosity of up to about 10 Pa·s at 25° C.; and
(v) a hydrosilylation catalyst;
characterised in that the filler treating agent (iii) and the products of the reaction thereof with component (ii) are packaged separately from the organohydrogensiloxane (iv) during storage and that the components in the multi part composition are mixed together immediately prior to use.

10. A method of preparing a composition in accordance with claim 1 comprising the steps of:
(a) treating an inorganic filler having a hydrophilic surface with a filler treating agent comprising an organopolysiloxane comprising at least 2 hydroxy, alkoxy, or otherwise hydrolysable groups, or a mixture thereof and having an average degree of polymerisation of from 2 to 50;
(b) mixing the product of step (a) into a multi component composition comprising
an organopolysiloxane comprising at least two unsaturated groups and having a viscosity of at least 1,000 mPa·s at 25° C.;
an organohydrogensiloxane having an average of greater than two silicon bonded hydrogen atoms per molecule and having a viscosity of up to about 10 Pa·s at 25° C.; and
a hydrosilylation catalyst;
characterised in that the filler treating agent and the products of the reaction thereof with component (ii) are packaged separately from the organohydrogensiloxane during storage and that the components in the multi part composition are mixed together immediately prior to use.

11. A method of preparing a composition in accordance with claim 1 comprising the steps
(a) treating an inorganic filler having a hydrophilic surface with a filler treating agent comprising an organopolysiloxane comprising at least 2 hydroxy, alkoxy, or otherwise hydrolysable groups, or a mixture thereof and having an average degree of polymerisation of from 2 to 50;
(b) mixing the product of step (a) into a multi component composition comprising an organopolysiloxane comprising at least two unsaturated groups and having a viscosity of at least 1,000 mPa·s at 25° C. (i);

an organohydrogensiloxane having an average of greater than two silicon bonded hydrogen atoms per molecule and having a viscosity of up to about 10 Pa·s at 25° C. (iv); and a hydrosilylation catalyst (v);

wherein each part containing the reaction product of step (a) does not contain any of the organohydrogensiloxane (iv) prior to curing.

12. A silicone elastomer obtainable by curing the composition in accordance with claim 1.

13. A finished article formed by a cured composition in accordance with claim 12.

* * * * *

UNITED STATES PATENT AND TRADEMARK OFFICE
CERTIFICATE OF CORRECTION

| | | |
|---|---|---|
| PATENT NO. | : 8,329,831 B2 | Page 1 of 1 |
| APPLICATION NO. | : 12/306057 | |
| DATED | : December 11, 2012 | |
| INVENTOR(S) | : Rapson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this
Eleventh Day of November, 2014

Michelle K. Lee
*Deputy Director of the United States Patent and Trademark Office*